United States Patent [19]
Brooks

[11] Patent Number: 6,069,623
[45] Date of Patent: May 30, 2000

[54] METHOD AND SYSTEM FOR THE DYNAMIC CUSTOMIZATION OF GRAPHICAL USER INTERFACE ELEMENTS

[75] Inventor: Arthur P. Brooks, Oronoco, Minn.

[73] Assignee: International Business Machines Corporation, Armonk, N.Y.

[21] Appl. No.: 08/934,336

[22] Filed: Sep. 19, 1997

[51] Int. Cl.[7] .................................................. G06F 3/00
[52] U.S. Cl. ........................................ 345/333; 345/145
[58] Field of Search .................................. 345/333, 334, 345/352, 353, 335, 340, 348–349, 354, 356–357, 326, 112, 121, 145, 146

[56] References Cited

U.S. PATENT DOCUMENTS

| | | | |
|---|---|---|---|
| 5,384,910 | 1/1995 | Torres ....................................... | 345/352 |
| 5,644,738 | 7/1997 | Goldman et al. ........................ | 345/352 |
| 5,758,093 | 5/1998 | Boezeman et al. .................. | 395/200.93 |
| 5,760,768 | 6/1998 | Gram ....................................... | 345/333 |
| 5,764,226 | 6/1998 | Consolatti et al. ...................... | 345/333 |

*Primary Examiner*—Steven Sax
*Attorney, Agent, or Firm*—Felsman, Bradley, Vaden, Gunter & Dillon

[57] ABSTRACT

A method and system for customizing graphical user interface elements displayed within a graphic interface of a data-processing system and for customizing graphical user interface elements, such as menus displayed within a graphic interface of a data-processing system. Each menu has a series of menu items, such that a selection of a particular item triggers a standard course of action associated with the menu item. The standard course of action can be initiated in response to a normal selection of a particular menu item. An alternative selection technique, recognizable by the data-processing system, is defined to support customization of the selected menu items associated with the selected menu. The alternative selection technique is utilized to initiate an alteration to a menu item selected by a user. The alternative selection technique can be initiated by a particular combination of keystrokes and/or user input derived from a pointing device. Utilization of the alternative selection technique enables a user to modify words, picture, location, or visibility associated with a selected menu choice, or other graphical user interface elements.

35 Claims, 7 Drawing Sheets

METHOD AND SYSTEM FOR THE DYNAMIC CUSTOMIZATION OF GRAPHICAL USER INTERFACE ELEMENTS

BACKGROUND OF THE INVENTION

1. Technical Field

The present invention relates in general to graphical user interfaces and in particular, to graphical user interface elements such as menus. The present invention also relates to textual menus, such as pull-down and context menus, and graphic menus such as toolbars and combination menus. Still more particularly, the present invention relates to methods and systems for managing the form or content of menu items displayed within a graphical user interface.

2. Description of the Related Art

A graphical user interface is a type of display format which enables a user to choose commands, start programs, and see lists of files, objects and other options by pointing to pictorial representations and lists of menu items on a computer display screen. Choices can generally be activated by either a keyboard or a pointing device such as a mouse. A mouse is a commonly utilized pointing device, containing one or more buttons, that allows a user to interact with a product or operating environment through an associated graphical user interface.

Some conventional graphical user interfaces provide a cursor and scroll bar for scrolling through portions of a viewable object. A viewable object is an object that is the focus of a user's attention. A viewable object can contain multiple components such as spreadsheets, text, hotlinks, pictures, sound, and video objects. However, a viewable object is not limited to these components. In many types of graphical user interfaces, a vertical or horizontal bar at the side or bottom of a graphical user interface window can be utilized in conjunction with a pointing device such as a mouse, trackball, or stylus to move about in a viewable object. Scrolling permits viewing of any desired portion of a viewable object and is so named because it is the electronic equivalent of reading through a rolled (i.e., scrolled) viewable object rather than flipping through pages of a book. A vertical scroll bar is usually utilized to control up and down movement (e.g., through lines and pages of a viewable object), while a horizontal scroll bar controls movement across a viewable object.

A typical graphical user interface also includes some sort of a menu arrangement. A menu in a graphical user interface is typically composed of a list of options from which a user can select in order to perform a desired action, such as choosing a command or applying a particular format to part of a document. A graphical user interface thus utilizes menus to provide users with an easily learned, easy-to-use alternative to memorizing program commands and their appropriate usage. Without such a menu, a user is forced to memorize such program commands and their appropriate usage, or resort to textbooks or other literature or still other computer programs associated with the particular graphical user interface or program. Choosing from one menu can often lead a user to a second menu or to a dialog box or dialog containing options that further refine the original menu section.

A typical menu is composed of a series of menu items that appear as choices displayed on the menu, selectable by input derived from either a keyboard or a pointing device such as a mouse. Menus can be pictorial or textual in nature or a combination of both. For example, a menu can be based on a "toolbar," well known in the art of graphical user interfaces, which provides pictorial elements representative of menu choices. A menu can also include well-known graphical user interface elements such as drop-down and context menus. Note that graphical user interface elements can also be referred to as graphic elements. Drop-down menus are also often referred to as pull-down menus. The same technique described herein can also be applied to other graphical user interface elements such as "command buttons." Whatever the case, pictorial or textual or both, an application that utilizes such menus to present choices of commands and available options is said to be "menu-driven." Menu-driven applications are thus considered "friendlier" than programs or applications based on a command-line interface which includes programs or applications that rely on commands typed on an on-screen prompt or represented by pictorial elements.

It is sometimes desirable to allow users of graphical applications displayed within a graphical user interface to customize the way in which the graphical user interface operates. Developers of such applications, however, cannot realistically anticipate which names or graphics for particular functions are most appropriate for every user, nor what type of organizations are most logically appropriate for such functions. It is also desirable for some applications to allow customers to add additional functions to an interface, or to hide elements of the standard interface from users. This is currently impossible for many applications and would be quite difficult for the remaining applications.

In the case of menus contained within graphical user interface applications, it is often desirable to alter such menus. However, altering or customizing menus is a difficult and often impossible task for the typical application user. From the foregoing, it can be seen that a need exists for a method and system that would allow users to customize a menu interface for graphical applications and system elements. Such a method and system, if implemented, would allow a user to transform a selected menu item in a manner that is independent of the location, name, and graphic of the menu item. Such a method and system provides a level of indirection between menu items displayed by a system, application, or product, and the logical workings of the system, application, or product. As presented initially to a user, such indirection would also provide a null operation (i.e., no transformation would occur). However, by providing such a level of indirection, a user can be provided with an opportunity to customize the graphical user interface utilized in association with the system, application or product via alteration of menus as described herein.

SUMMARY OF THE INVENTION

It is therefore one object of the present invention to provide an improved graphical user interface method and system.

It is therefore another object of the present invention to provide an improved method and system for managing menus displayed within a graphical user interface.

It is yet another object of the present invention to provide an improved method and system for dynamically managing menus maintained within graphical user interface applications.

The above and other objects are achieved as is now described. A method and system are disclosed for customizing graphical user interface elements displayed within a graphic interface of a data-processing system and for customizing graphical user interface elements, such as menus displayed within a graphic interface of a data-processing system. Each menu has a series of menu items, such that a selection of a particular item triggers a standard course of action associated with the menu item. The standard course of action can be initiated in response to a normal selection of a particular menu item. An alternative selection technique, recognizable by the data-processing system, is defined to support customization of the selected menu items associated with the selected menu. The alternative selection technique is utilized to initiate an alteration to a menu item selected by a user. The alternative selection technique can be initiated by a particular combination of keystrokes and/or user input derived from a pointing device. Utilization of the alternative selection technique enables a user to modify words, picture, location, or visibility associated with a selected menu choice, or other graphical user interface elements.

BRIEF DESCRIPTION OF THE DRAWINGS

The novel features believed characteristic of this invention are set forth in the appended claims. The invention itself, however, as well as a preferred mode of use, further objects, and advantages thereof, will best be understood by reference to the following detailed description of an illustrative embodiment when read in conjunction with the accompanying drawings, wherein:

DETAILED DESCRIPTION OF PREFERRED EMBODIMENT

Figure 1:
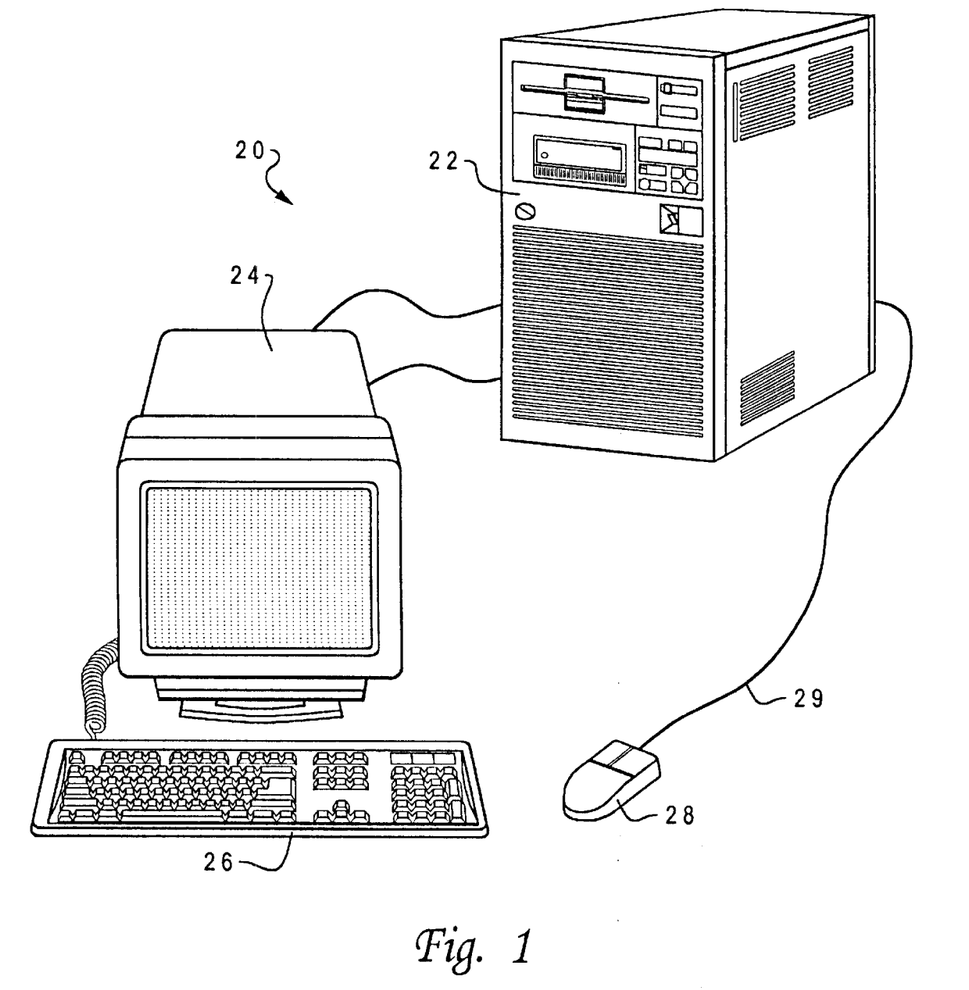
FIG. 1 illustrates a pictorial representation of a computer system in accordance with a preferred embodiment of the present invention.

With reference now to the figures and in particular with reference to FIG. 1, there is depicted a pictorial representation of a computer system in accordance with a preferred embodiment of the present invention. A computer system 20 is depicted that includes a system unit 22, a video display 24, a keyboard 26, and a mouse 28. Computer system 20 can be implemented utilizing any suitable computer such as the AS/400 computer system, IBM SYSTEM RISC/6000, or a personal computer. The AS/400 computer system and the IBM SYSTEM RISC/6000 are products of International Business Machines Corporation, located in Armonk, N.Y. Although the depicted embodiment involves a personal computer, a preferred embodiment of the present invention can be implemented in other types of data-processing systems, such as, for example, intelligent workstations or mini-computers. Computer system 20 includes a graphical user interface that resides within a machine-readable media to direct the operation of computer system 20. Those skilled in the art will appreciate that the method and system of the present invention apply equally to any computer system, regardless of whether the computer system is a complicated multi-user computing apparatus or a single-user workstation.

Keyboard 26 is that part of computer system 20 that resembles a typewriter keyboard and which enables a user to control particular aspects of the computer. Because information flows in one direction, from keyboard 26 to system unit 22, keyboard 26 functions as an input-only device. Functionally, keyboard 26 represents half of a complete input/output device, the output half being video display 24. Keyboard 26 includes a standard set of printable characters presented in a QWERTY pattern typical of most typewriters. In addition, keyboard 26 may include a calculator-like numeric keypad at one side and additional specialized keys. Some of these keys, such as the "Control," "Alt," and "Shift" keys may be utilized to change the meaning of another key. Other special keys and combinations of keys can be utilized to control program operations or to move either text or cursor on the display screen of video display 24.

Mouse 28 is a commonly utilized pointing device. The basic features of a typical mouse include a casing with a flat bottom that is designed to be gripped by one human hand. A typical mouse also includes one or more buttons located atop the mouse, and a multidirectional detection device (e.g., usually a ball) located on the bottom of the mouse. A cable 29 connects mouse 28 to a computer such as computer system 20. By moving mouse 28 on a surface (e.g, a desk surface or a mouse pad), the user typically controls an on-screen cursor. Such a mouse is a relative pointing device, because the mouse's movement is not defined by limitations, and also because its placement on a surface does not map directly to a specific location on a computer screen. Generally, to select items or choose commands on a screen displayed graphical user interface, the user presses one or more mouse buttons, producing a so-called mouse "click." The mouse can be utilized to manipulate a mouse pointer which is an on-screen element whose location changes as the user moves the mouse. Depending on the location of the mouse pointer and the operation of the program with which it is working, the area of the screen where the mouse pointer appears serves as the target for an action when the user presses one of the mouse buttons.

Figure 2:
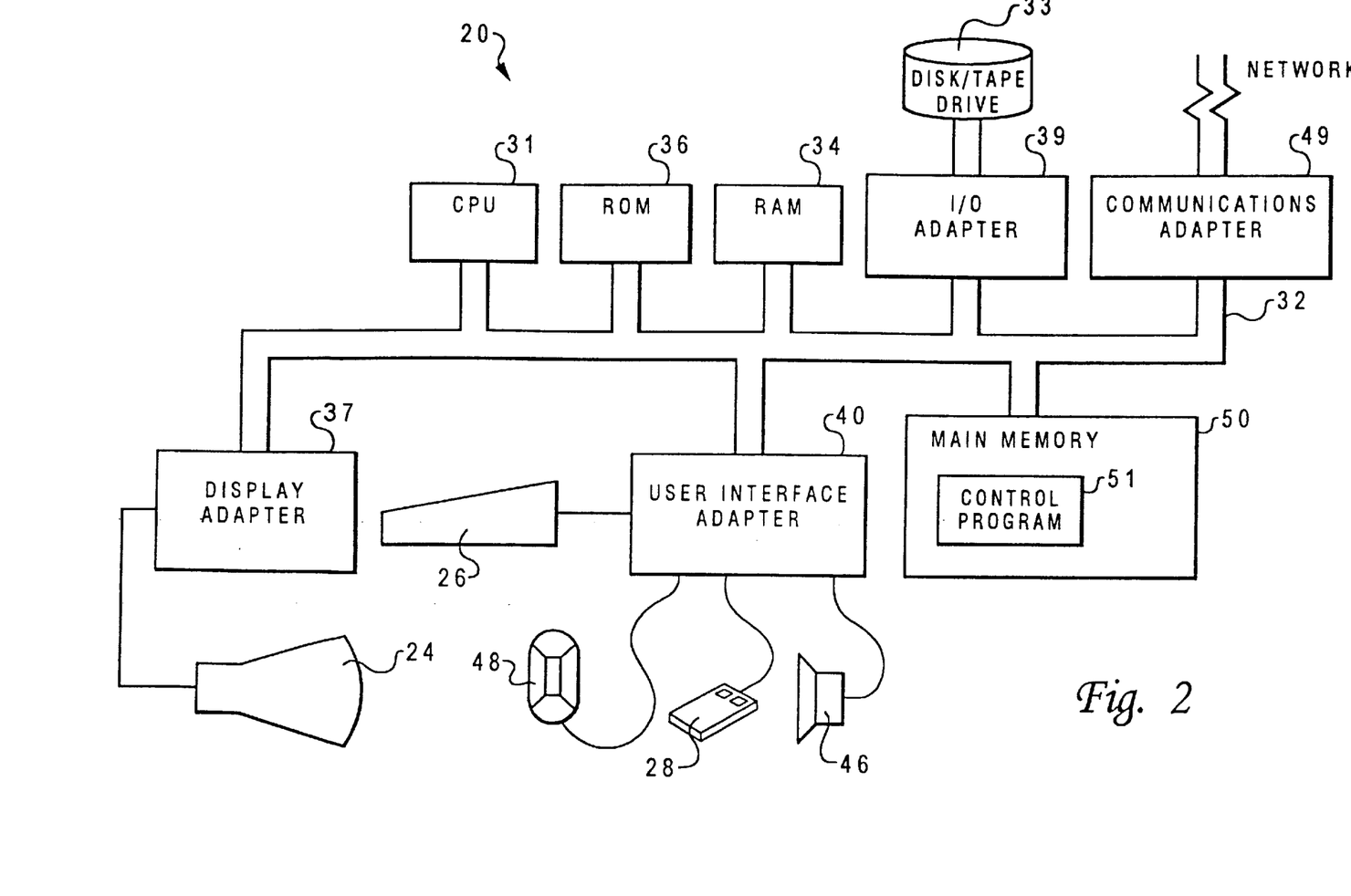
FIG. 2 depicts a representative hardware environment of a computer system in accordance with a the preferred embodiment of the present invention.

FIG. 2 depicts a representative hardware environment of a computer system in accordance with a preferred embodiment of the present invention. System unit 22 includes a Central Processing Unit ("CPU") 31, such as a conventional microprocessor, and a number of other units interconnected via system bus 32. Computer system 20 includes random-access memory ("RAM") 34, read-only memory ("ROM") 36, display adapter 37 for connecting system bus 32 to video display 24, and I/O adapter 39 for connecting peripheral devices such as disk and tape drives 33 to system bus 32.

Disk and tape drives 33 are electro-mechanical devices that read from and write to disks. The main components of a disk drive include a spindle on which the disk is mounted, a drive motor that spins the disk when the drive is in operation, one or more read/write heads that perform the actual reading and writing, a second motor that positions the read/write heads over the disk, and controller circuitry that synchronizes read/write activities and transfers information to and from computer system 20. A disk itself is typically a round, flat piece of flexible plastic (e.g., floppy disk) or inflexible metal (e.g. hard disk) coated with a magnetic material that can be electrically influenced to hold information recorded in digital (i.e., binary) form. A disk is, in most computers, the primary method for storing data on a permanent or semipermanent basis. Because the magnetic coating of the disk must be protected from damage and contamination, a floppy (e.g., 5.25 inch) disk or microfloppy (e.g., 3.5 inch) disk is encased in a protective plastic jacket. A hard disk, which is very finely machined, is typically enclosed in a rigid case and can be exposed only in a dust free environment.

Video display 24 is the visual output of computer system 20. Video display 24 can be, for example, a CRT-based video display well-known in the art of computer hardware. "CRT" is an acronym for cathode-ray tube. With a portable or notebook-based computer, video display 24 can be replaced with an LCD-based or a gas plasma-based flat-panel display. "LCD" is an acronym for liquid crystal display. Computer system 20 further includes user interface adapter 40 for connecting keyboard 26, mouse 28, speaker 46, microphone 48, and/or other user interface devices, such as a touch screen device (not shown), to system bus 32. Communications adapter 49 connects computer system 20 to a computer network. Although computer system 20 is shown to contain only a single CPU and a single system bus, it should be understood that the present invention applies equally to computer systems that posses multiple CPUs and to computer systems that include multiple buses that each perform different functions in different ways.

Computer system 20 also includes a graphical user interface that resides within a machine-readable media to direct the operation of computer system 20. Any suitable machine-readable media may retain the graphical user interface, such as RAM 34, ROM 36, a magnetic diskette, magnetic tape, or optical disk (the last three being located in disk and tape drives 33). Any suitable operating system and associated graphical user interface (e.g., Microsoft Windows) may direct CPU 31. For example, the AIX operating system and AIXwindows windowing system (i.e., graphical user interface) can direct CPU 31. The AIX operating system is IBM's implementation of the UNIX operating system. UNIX is a trademark of UNIX Systems Laboratories, Inc. Other technologies can also be utilized in association with CPU 31, such as touch-screen technology or human voice control. Those skilled in the art will appreciate that the hardware depicted in FIG. 2 may vary for specific applications. For example, other peripheral devices such as optical disk media, audio adapters, or chip-programming devices, such as PAL or EPROM programming devices well-known in the art of computer hardware, and the like may be utilized in addition to or in place of the hardware already depicted.

Main memory 50 is connected to system bus 32, and includes a control program 51 that resides within main memory 50 and contains instructions that when executed on CPU 31, carry out the operations depicted in the logic flow chart described herein. The computer program product can also be referred to as a program product. It is important that, while the present invention has been (and will continue to be) described in the context of a fully functional computer system, those skilled in the art will appreciate that the present invention is capable of being distributed as a program product in a variety of forms, and that the present invention applies equally regardless of the particular type of signal-bearing media utilized to actually carry out the distribution.

Examples of signal-bearing media include: recordable-type media, such as floppy disks, hard disk drives and CD ROMs, and transmission-type media such as digital and analog communication links. Examples of transmission-type media include devices such as modems. A modem is a type of communications device that enables a computer to transmit information over a standard telephone line. Because a computer is digital (i.e., works with discrete electrical signals representative of binary 1 and binary 0) and a telephone line is analog (i.e., carries a signal that can have any of a large number of variations), modems can be utilized to convert digital to analog and vice-versa. The term "media" as utilized herein is a collective word for the physical material such as paper, disk, CD-ROM, tape and so forth, utilized for storing computer-based information.

Figure 3:
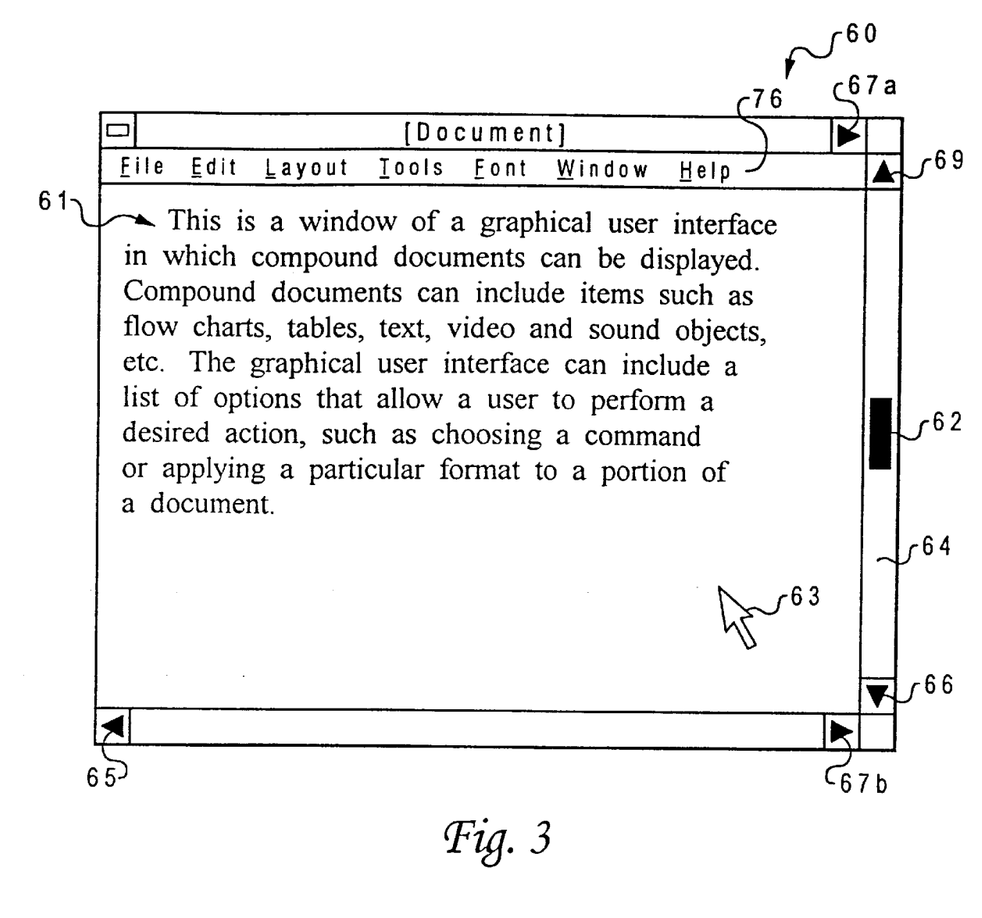
FIG. 3 illustrates a pictorial representation of a graphical user interface window in accordance with a preferred embodiment of the present invention.
Figure 4:
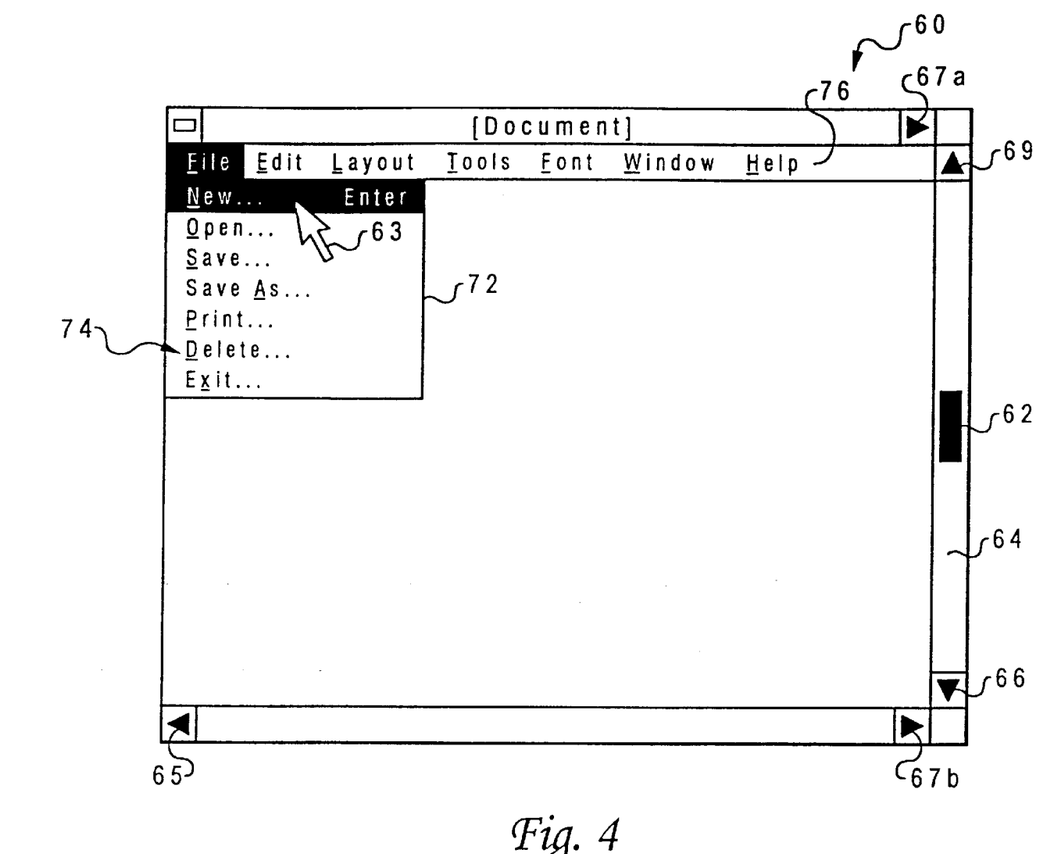
FIG. 4 depicts a graphical user interface window and a menu dialog box disposed therein in accordance with a preferred embodiment of the present invention.

In FIG. 3 and FIG. 4, like parts are indicated by like numbers. FIG. 3 illustrates a pictorial representation of a graphical user interface window 60 in accordance with the method and system of the present invention. Window 60 displays a portion of a viewable object, such as a compound document 61. Window 60 is an area on the display screen of a visual display device such as video display 24 of FIG. 1 that is utilized to present a view of an object or to conduct a dialog with a user. Such "windows" can be utilized to present objects, action options, messages, and so forth.

Compound document 61 is a viewable object that can contain multiple components, such as spreadsheets, text, hotlinks, pictures, sound, and video objects. Examples of objects capable of running within the compound document include graphical representations, spreadsheets or a collection of text. In conventional graphical user interface window environments, a typical window displays a portion (e.g. a page) of a compound document. The size and position of the elevator within a window scroll bar corresponds to the size and position of the current viewable object in relation to the compound document. Because a compound document can include too large or too many objects to view simultaneously, the user can position a mouse cursor over an arrow section of the window scroll bar and click a pointing device (e.g. a mouse) to scroll the document upward or downward, as appropriate.

The size and position of slider 62 within scroll bar 64 corresponds to the size and position of the current viewable page in relation to compound document 61. The current viewable page is contained within a viewable window area within window 60. Window 60 also includes a menu bar 76. Menu bar 76 is a displayed rectangular bar from which menus can be selected by a user. Those skilled in the art will appreciate that compound document 61 is a document having multiple objects capable of running within the document such as spreadsheets, text, hotlinks, pictures, sounds, and video objects. Other examples of objects capable of running within a compound document such as computer document 61 include graphical representations, spreadsheets, or a collection of text. Names of available menus are displayed within menu bar 76. Choosing a particular menu in response to user input (e.g., mouse or keyboard user input) causes a list of options in the particular menu chosen to be displayed.

Because compound document 61 may include too many pages to view simultaneously, the user can position a mouse cursor 63 over up-arrow 69 or down-arrow 66 of scroll bar 64 and "click" a button on a pointing device such as a mouse to scroll the document upward or downward, as appropriate. Scrolling in this manner permits viewing of any desired portion of compound document 61. Scrolling is essentially the electronic equivalent of reading through a rolled (i.e., "scrolled") document rather than flipping through pages of a book. Arrows 65, 67a and 67b can also be utilized by a graphical user interface user to scroll left or right through compound document 61. Scroll bar 64 is thus a graphical user interface window component, associated with a scrollable area, that indicates to a user that more information is available in a particular direction and can be scrolled into view.

In FIG. 3, the graphical user interface window 60 sizes slider 62 within scroll bar 64 according to the number of pages in compound document 61. The length of slider 62 is small with respect to the length of scroll bar 64 because it represents one of many pages of compound document 61. Similarly, the graphical user interface positions slider 62 within scroll bar 64 relative to the viewable position of compound document 61. For example, the graphical user interface positions slider 62 at the top of scroll bar 64 when the user is viewing the first page of compound document 61, and at the bottom of scroll bar 64 when the user is viewing the last page of compound document 61. Slider 62 on scroll bar 64 is defined to have a minimum size.

FIG. 4 depicts a graphical user interface window 60 and a pull-down menu 72 disposed therein in accordance with a preferred embodiment of the present invention. Note that the term "pull-down menu" can also be referred to as a "drop-down menu." In the example depicted in FIG. 4, cursor 63 has been moved by the user to the "File" menu choice. Pull-down menu 72 presents a menu of related choices that extends from a selected choice on menu bar 76. Pull-down menu 72 supplements the interaction in window 60, and is dependent upon window 60. The "File" menu choice is displayed within menu bar 76. In response to user input, pull-down menu 72 is displayed near the "File" menu name. Pull-down menu 72 includes a list of options from which a user can select in order to perform a desired action, such as choosing a command or applying a particular format to part of a document.

Pull-down menu 72 thus includes a series of menu items, such that a selection of a particular menu item triggers a standard course of action associated with the particular menu item selected. For example, one standard course of action associated with the menu item "Print," is an operation in which a document displayed within window 60 is printed on a printer connected to the computer system in which the given graphical user interface is running. Thus, those skilled in the art will appreciate that pull-down menu 72 presents easily learned, easy-to-use alternatives to memorizing program commands and their appropriate usage. Choosing a menu item can optionally lead the user to a second menu or dialog containing options that further refine the original menu selection.

Menu items 74 are included within pull-down menu 72. A specific menu item represented by the word "Delete" is depicted within pull-down menu 72. A menu item is a choice on pull-down menu 72, selectable by either keyboard or mouse user input. In some instances, a menu item that is not available or not appropriate for a particular situation is "grayed" (i.e., dimmed in comparison to the valid menu choices). Menu items that are about to be selected are shaded. For example, in FIG. 4, mouse cursor 63 is positioned over the "New" menu item. The "New" menu item is shaded to indicate that this action (i.e., an action associated with the "New" menu item) will be initiated upon appropriate user input, such as activation of a pointing device such as a mouse (e.g., a mouse "click"). In cases where a choice is followed by the display of an ellipsis (i.e., a graphical user interface object well known in the art of graphical user interface environments) a secondary menu is subsequently displayed for further refinement as part of initiation of the action.

In accordance with a preferred embodiment of the present invention, by utilizing a modifier key, such as "Alt" or "Ctrl" in combination with "clicking" a particular menu item, a customization dialog is presented to the user that pertains not to the object or action normally selected, but to the menu interface over that object or action instead. Those skilled in the art will appreciate that the term "dialog" as used in the art of computing, refers commonly to the exchange of human input and immediate machine responses that forms a "conversation" between an interactive computer and the user of the interactive computer. Such a "dialog" is a typical feature included among most graphical user interface environments. The customization dialog controls the currently selected menu (i.e., pull-down menu 72). The contents of this new dialog include operations that allow a user to customize the currently displayed menu (i.e., pull-down menu 72) in real time. When the user responds appropriately to options presented in this customization dialog, pull-down menu 72 is altered accordingly.

Figure 5:
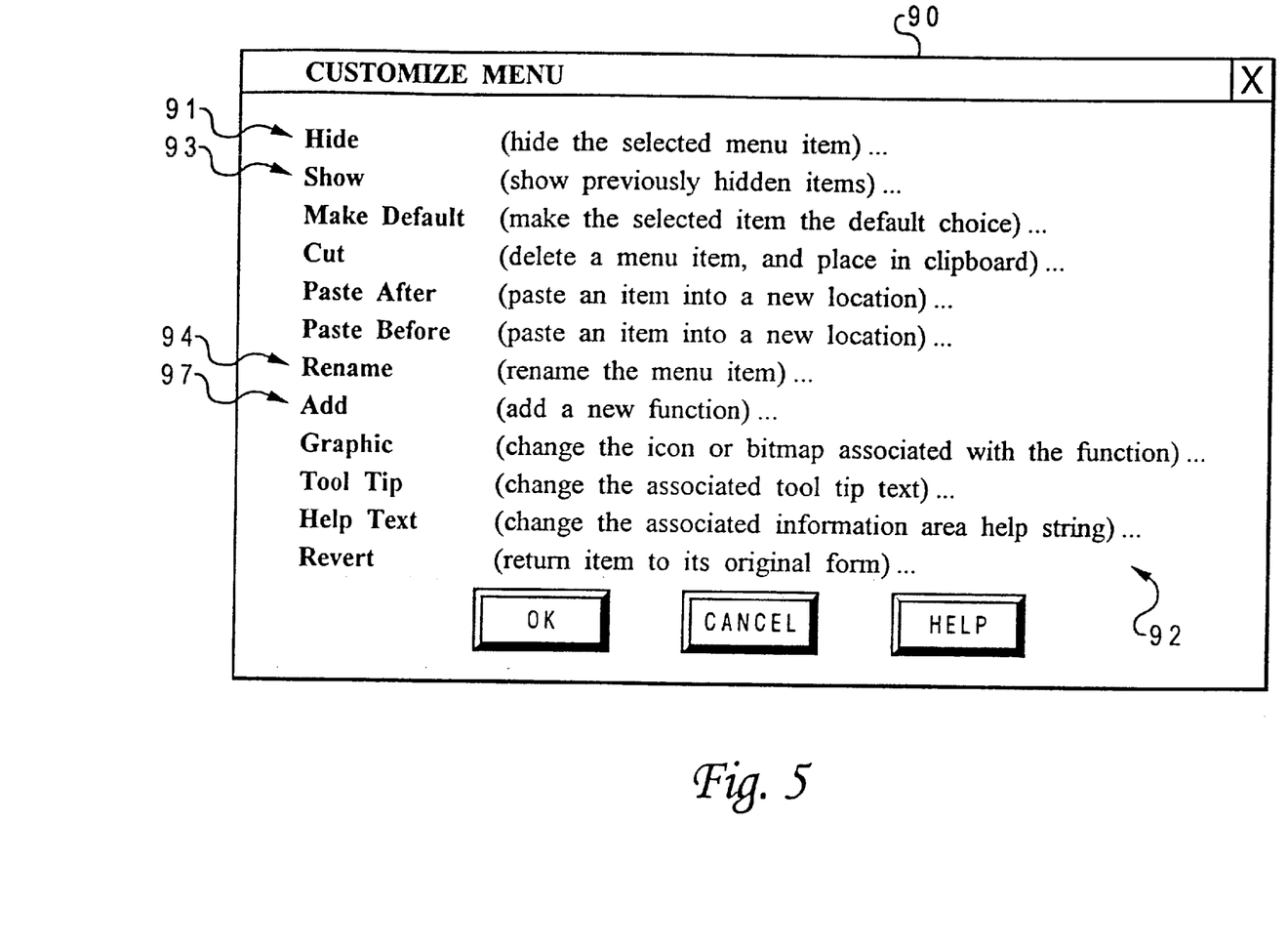
FIG. 5 illustrates a customization dialog displayed within a graphical user interface window in accordance with a preferred embodiment of the present invention.

FIG. 5 illustrates a customization dialog 90 that can be displayed within a graphical user interface window in accordance with a preferred embodiment of the present invention. Customization dialog 90 can be displayed over window 60 of FIG. 4, in response to an indication by the user that the user desires to customize a currently displayed menu (e.g., pull-down menu 72 of FIG. 4). Such an indication is provided when the user utilizes an alternative selection technique, such as a modifier (e.g., "Alt" or "Ctrl" keys) in combination with a mouse "click" at a particular menu item displayed within pull-down menu 72. Customization dialog 90 allows a user to customize the prior menu (e.g., menu 72 of FIG. 4) in real time. Customization dialog 90 includes a menu 92 that includes a series of individual menu items. Menu item 94, for example, presents the menu item "Rename." Choosing the menu item "Rename" allows the user to provide an alternative name to the item selected in the subject menu (e.g., menu 72).

Figure 6:
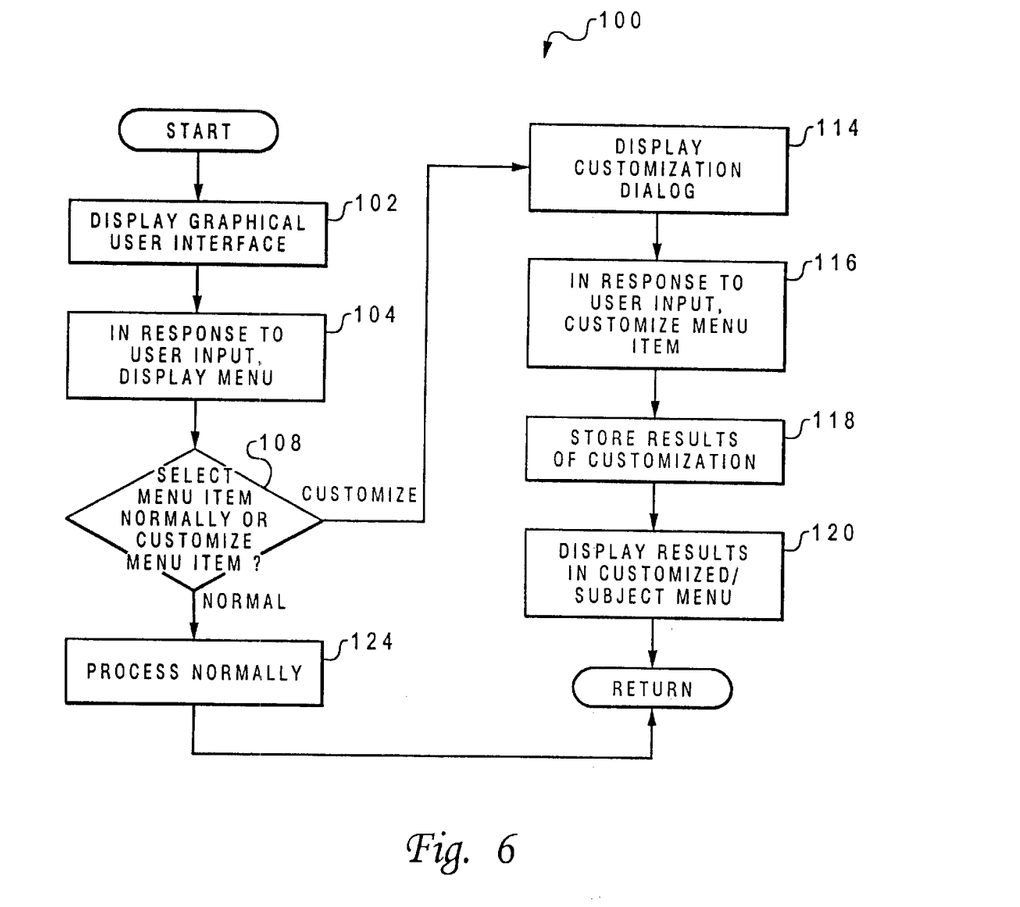
FIG. 6 is a flow diagram that shows steps utilized to carry out the method and system of the present invention, according to a preferred embodiment of the present invention.
Figure 7:
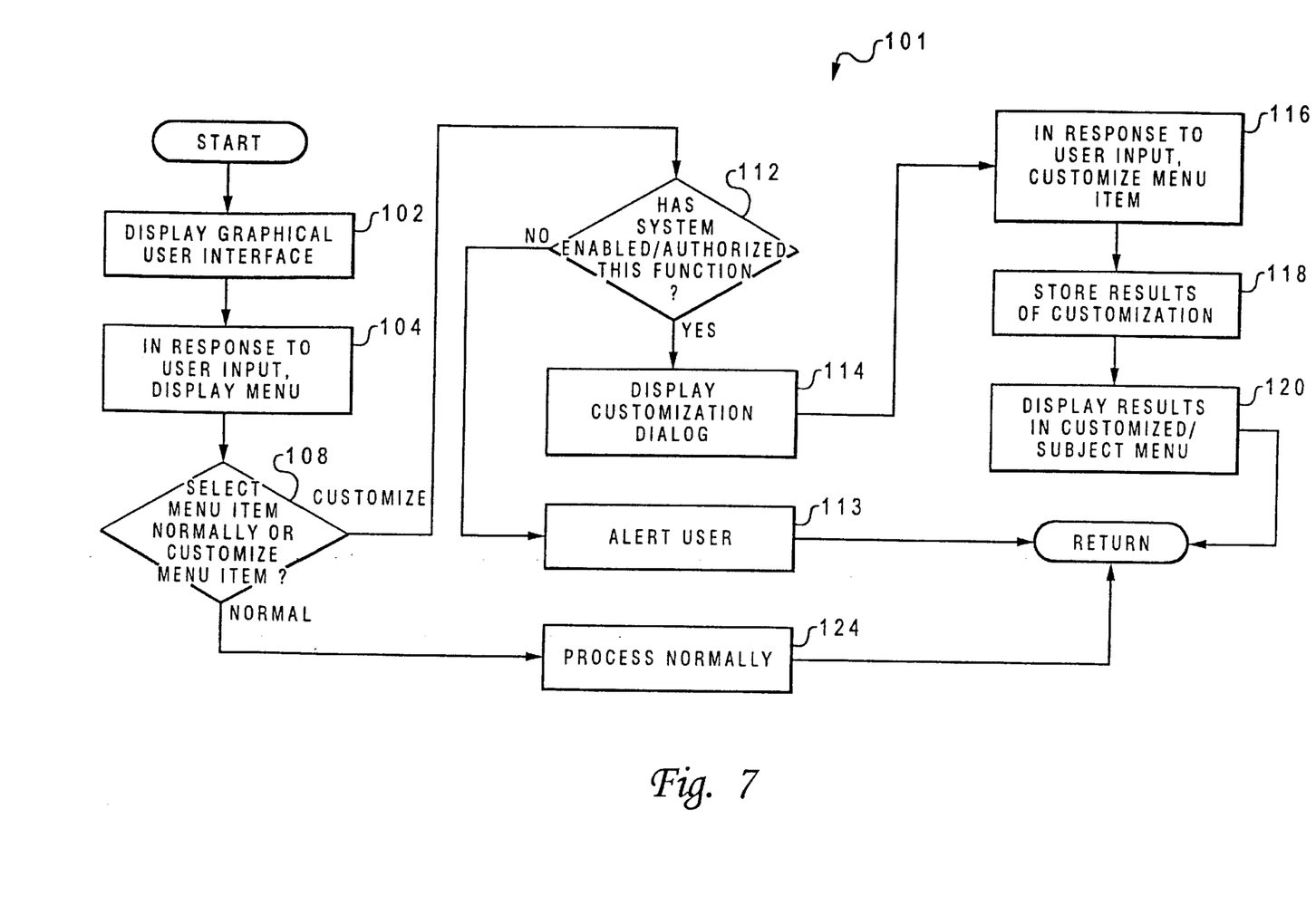
FIG. 7 is a flow diagram that shows steps utilized to carry out the method and system of the present invention, according to an alternative preferred embodiment of the present invention.

In FIG. 6 and FIG. 7, like parts are referenced by like reference numerals. FIG. 6 is a flow diagram 100 that shows steps utilized to carry out the method and system of the present invention, according to a preferred embodiment of the present invention. It can be appreciated by those skilled in the art that FIG. 6 presents a self-consistent sequence of steps leading to a desired result. The steps are those requiring physical manipulation of physical quantities. Usually, although not necessarily, these quantities take the form of electrical or magnetic signals capable of being stored, transferred, combined, compared, and otherwise manipulated. It has proven convenient at times by those skilled in the art, to refer to these signals as bits, values, elements, symbols, characters, terms, numbers, or the like. It should be borne in mind, however, that all of these and similar terms are to be associated with the appropriate physical quantities and are merely convenient labels applied to these quantities.

Further, the manipulations performed are often referred to in terms, such as adding or comparing, which are commonly associated with mental operations performed by a human operator. No such capability of a human operator is necessary or desirable in most cases in any of the operations described herein which form part of the present invention; the operations are machine operations. Useful machines for performing operations of a preferred embodiment of the present invention include data-processing systems such as general purpose digital computers or other similar devices. In all cases the distinction between the method operations in operating a computer and the method of computation itself should be borne in mind. The present invention relates to method steps for operating a computer, such as computer 20 depicted in FIG. 1 and FIG. 2, in processing electrical or other (e.g. mechanical, chemical) physical signals to generate other desired physical signals.

Thus, as depicted at block 102, a graphical user interface such as a window well known in the art of data-processing systems is displayed. As illustrated at block 104, in response to user input, a menu is displayed within the graphical user interface. The menu displayed within the graphical user interface has a series of menu items, such that a selection of a particular menu item triggers a standard course of action associated with that particular menu item. As illustrated at block 108, a test is performed to determine whether a menu item is selected normally or by the alternative selection technique (i.e., which results in menu customization). To select a menu item normally, a user merely selects the menu item with a pointing device such as a mouse. A mouse "click," for example, at the menu item, triggers a standard course of action associated with that particular menu item. If the menu item is selected normally, then as described at block 124, (customization of the menu or menu item is not desired), the graphical user interface continues to process normally. However, if the user elects to customize the menu item, and hence the menu itself, a different series of operations subsequently occurs.

To initiate a different series of operations, the user can "click" the menu item with a pointing device while simultaneously pressing/holding down a particular modifier key (e.g. Shift, Alt, Ctrl, etc.). The manner in which customization of the menu is triggered is based on completing a predetermined alternative selection technique that initiates customization of the menu choices selected. Such a particular alternative selection technique can include the performance of the aforementioned mouse "click" in association with a particular complementary keystroke. Those skilled in the art, however, will appreciate that other predetermined alternative selection techniques can also be implemented in accordance with a preferred embodiment of the present invention.

As depicted at block 114, a menu customization dialog is displayed in response to choosing "customization" as depicted at block 108. Such a customization dialog is analogous to customization dialog 90 depicted in FIG. 5. As illustrated at block 116, in response to user input, the menu item can then be customized according to the functions depicted in the customization dialog. The customization dialog is a new dialog that pertains not to the object or action selected (i.e., the object of the prior selected menu item) but rather to the menu interface over that particular object or action. This new menu (i.e., the customization dialog) controls how the previously selected menu (i.e., the menu displayed, as depicted in block 104) will appear when it is subsequently utilized by the user.

The operation described at block 116 involves the steps of associating a particular menu item with a user defined alternative form (e.g., name, location, visibility, graphic, etc.). The alternative form is implemented upon the selected menu item (i.e., the menu item selected from pull-down menu 72 that the user desires to customize). An alternative form can include, but is not limited to, an alternative name for a selected menu item, changing the location of the selected item, altering the visibility of a selected menu item, changing a graphic associated with the selected menu item, and so forth. For example, in the illustration depicted in FIG. 5 customization dialog 90 presents a list of actions that may be utilized to customize the menu items depicted in pull-down menu 72 of FIG. 4. Menu item 91 as depicted in FIG. 5 is one course of action that may be taken (i.e., hide the menu item selected from pull-down menu 72 of FIG. 4). Menu item 93 is another example of a course of action that may be taken (i.e., show previously hidden menu items). Menu item 97 presents another alternative course of action (i.e., add a new function to pull-down menu 72). Thus, those skilled in the art will appreciate that the function of each menu item in the selected menu (e.g., pull-down menu 72) remains the same after customization via the customization dialog. The selected menu items (i.e., menu items selected from pull-down menu 72), are not functionally altered, however the interface over those selected menu items is altered (i.e., customized).

As depicted at block 118, the results of the customization operation performed (as depicted at block 116) are then stored. As illustrated at block 120, the results of the customization are now displayed within the customized menu. For example, if a user chooses to rename the menu item, then upon closing the customization dialog, the original menu can be displayed showing the newly named menu choice. The process then ends following completion of the operation described at block 120. Those skilled in the art will appreciate that variations to this operation can be implemented in accordance with a preferred embodiment of the present invention.

FIG. 7 is a flow diagram 101 that shows steps utilized to carry out the method and system of the present invention, according to an alternative preferred embodiment of the present invention. The steps depicted in FIG. 7 are identical to the steps depicted in FIG. 5 with the exception of additional alternative steps represented in FIG. 7 by blocks 112 and 113. As depicted at block 112, a test is performed to determine whether or not the computer system, in association with the particular data-processing system utilized by the user, has enabled or authorized the user to customize the menu or all menus (e.g., pull-down menu 72 described herein). If the data-processing system has not enabled the function, or the user is not authorized to customize the menu, then as depicted at block 113, the user can be alerted (e.g., via a textual message warning or a sound "beep") that the function is not enabled or that the user is not authorized to customize the menu. Likewise, the alternative selection can simply be ignored by the system and treated as an accidental null operation.

If, however, the function is enabled and the user is authorized to customize the menu, then as depicted at block 114, a customization dialog is displayed. Such a customization dialog is analogous to customization dialog 90 depicted in FIG. 5. As illustrated at block 116, in response to user input, the menu item can then be customized according to the functions depicted in the customization dialog. The customization dialog is a new dialog that pertains not to the object or action selected (i.e., the object of the prior selected menu item) but rather to the menu interface over that particular object or action. This new menu (i.e., the customization dialog) controls how the previously selected menu (i.e., the menu displayed, as depicted in block 104) will appear when it is subsequently utilized by the user. The remaining steps depicted in FIG. 7 are thus analogous to the identical steps referenced in FIG. 6. Those skilled in the art will appreciate that FIG. 7 thus presents an alternative preferred embodiment which includes optional steps for testing whether or not the user is permitted to customize the menu.

The embodiments and examples set forth herein are presented in order to best explain the present invention and its practical application and to thereby enable those skilled in the art to make and use the invention. However, those skilled in the art will recognize that the foregoing description and examples have been presented for the purposes of illustration and example only, and may be utilized to customize other graphical user interface elements, objects and functions, not merely pull-down, context menus, toolbars and so forth as described herein.

For example, a preferred embodiment of the present invention can be utilized to customize other graphical user interface elements, such as the name and/or graphic assigned to particular command buttons. Another example in which a preferred embodiment of the present invention can be utilized include customization of graphical user interface elements or devices such as sliders (e.g., substituting a slider control for a dial or vice versa). A preferred embodiment of the present invention can also be applied to "Help" files associated with a particular application. By including a hidden symbol in the "Help" text to denote indirection, the "Help" presentation can transparently support customization as well. When displaying "Help" text, an indirection symbol is detected so that presentation software utilized in association with the application checks to determine if the standard (e.g., shipped, default, etc.) name and/or graphic has been customized, and if so, displays the altered values instead of the default or standard values. Thus, customizing graphical user interface elements can also automatically customize the "Help" text describing such elements.

From the foregoing, those skilled in the art can appreciate that the description as set forth is not intended to be exhaustive or to limit the invention to the precise form disclosed. Many modifications and variations are possible in light of the above teaching without departing from the spirit and scope of the following claims.

What is claimed is:

1. A method for dynamically customizing graphic elements displayed within a graphic interface of a data-processing system, comprising the steps of:

displaying within said graphic interface a graphic element said graphic element having a first graphical appearance, wherein a selection of said graphic element utilizing a standard selection technique triggers a standard course of action associated with said graphic element;

designating a predetermined alternative selection technique for invoking a customization routine;

positioning a cursor over said graphic element and selecting said graphic element while said cursor is positioned over said graphic element utilizing said predetermined alternative selection technique;

invoking said customization routine in response to said selection of said graphic element utilizing said predetermined alternative selection technique, wherein said first graphical appearance of said graphic element may be customized;

creating a second graphical appearance of said graphic element utilizing said customization routine; and displaying said graphic element having said second graphical appearance.

2. The method of claim 1 wherein the step of designating a predetermined alternative selection technique, further comprises the step of:

designating a particular combination of keystrokes.

3. The method of claim 2 wherein the step of designating a predetermined alternative selection technique, further comprises the step of:

designating a particular combination of keystrokes and an input derived from a pointing device.

4. The method according to claim 3, further comprising the steps of:

displaying said graphic element having said first graphical appearance, said first graphical appearance including a first name for said graphic element; and creating a second graphical appearance including a second name for said graphic element.

5. The method according to claim 3, further comprising the steps of:

displaying said graphic element having said first graphical appearance, said first graphical appearance including a first icon associated with said graphic element; and creating a second graphical appearance including a second icon associated with said graphic element.

6. The method according to claim 3, further comprising the steps of:

displaying said graphic element having said first graphical appearance, said first graphical appearance including a first location within a menu wherein said graphic element is displayed; and modifying said first graphical appearance by moving said graphic element from said first location to a second location within said menu.

7. The method according to claim 3, further comprising the steps of:

displaying said graphic element having said first graphical appearance, said first graphical appearance including a first bitmap associated with said graphic element; and creating a second graphical appearance, said second graphical appearance including a second bitmap associated with said graphic element.

8. The method according to claim 3, further comprising the steps of:

displaying said graphic element having said first graphical appearance, said first graphical appearance including said graphic element being visible; and creating a second graphical appearance, said second graphical appearance including said graphic element being invisible.

9. The method according to claim 8, further comprising the steps of:

displaying said graphic element having said first graphical appearance, said first graphical appearance including said graphic element being invisible; and creating a second graphical appearance, said second graphical appearance including said graphic element being visible.

10. The method according to claim 7, wherein the step of designating a particular combination of keystrokes and an input derived from a pointing device further comprises the step of designating a depression of an ALT key in combination with an input selection made utilizing a mouse button.

11. The method according to claim 7, wherein the step of designating a particular combination of keystrokes and an input derived from a pointing device further comprises the step of designating a depression of a CTRL key in combination with an input selection made utilizing a mouse button.

12. A data processing system for dynamically customizing graphic elements displayed within a graphic interface of said data processing system, comprising:

means for displaying within said graphic interface a graphic element, said graphic element having a first graphical appearance, wherein a selection of said graphic element utilizing a standard selection technique triggers a standard course of action associated with said graphic element;

means for designating a predetermined alternative selection technique for invoking a customization routine;

means for positioning a cursor over said graphic element and selecting said graphic element while said cursor is positioned over said graphic element utilizing said predetermined alternative selection technique;

means for invoking said customization routine in response to said selection of said graphic element utilizing said predetermined alternative selection technique, wherein said first graphical appearance of said graphic element may be customized;

means for creating a second graphical appearance of said graphic element utilizing said customization routine; and means for displaying said graphic element having said second graphical appearance.

13. The system of claim 12, wherein said means for designating a predetermined alternative selection technique, further comprises means for designating a particular combination of keystrokes.

14. The system of claim 13 wherein said means for designating a predetermined alternative selection technique, further comprises means for designating a particular combination of keystrokes and an input derived from a pointing device.

15. The system according to claim 14, further comprising:

means for displaying said graphic element having said first graphical appearance, said first graphical appearance including a first name for said graphic element; and means for creating a second graphical appearance including a second name for said graphic element.

16. The system according to claim 14, further comprising:

means for displaying said graphic element having said first graphical appearance, said first graphical appearance including a first icon associated with said graphic element; and means for creating a second graphical appearance including a second icon associated with said graphic element.

17. The system according to claim 14, further comprising:

means for displaying said graphic element having said first graphical appearance, said first graphical appearance including a first location within a menu wherein said graphic element is displayed; and means for creating a second graphical appearance, said second graphical appearance including a second location within said menu wherein said graphic element is displayed.

18. The system according to claim 14, further comprising:

means for displaying said graphic element having said first graphical appearance, said first graphical appearance including a first bitmap associated with said graphic element; and means for creating a second graphical appearance, said second graphical appearance including a second bitmap associated with said graphic element.

19. The system according to claim 14, further comprising:

means for displaying said graphic element having said first graphical appearance, said first graphical appearance including said graphic element being visible; and means for creating a second graphical appearance, said second graphical appearance including said graphic element being invisible.

20. The system according to claim 19, further comprising:

means for displaying said graphic element having said first graphical appearance, said first graphical appearance including said graphic element being invisible; and means for creating a second graphical appearance, said second graphical appearance including said graphic element being visible.

21. The system according to claim 17, wherein said means for designating a particular combination of keystrokes and an input derived from a pointing device further comprises means for designating a depression of an ALT key in combination with an input selection made utilizing a mouse button.

22. The system according to claim 17, wherein said means for designating a particular combination of keystrokes and an input derived from a pointing device further comprises means for designating a depression of a CTRL key in combination with an input selection made utilizing a mouse button.

23. A program product for dynamically customizing graphic elements displayed within a graphic interface of said data processing system, said program product comprising:

program product program product means for displaying within said graphic interface a graphic element, said graphic element having a first graphical appearance, wherein a selection of said graphic element utilizing a standard selection technique triggers a standard course of action associated with said graphic element;

program product means for designating a predetermined alternative selection technique for invoking a customization routine;

program product means for positioning a cursor over said graphic element and selecting said graphic element while said cursor is positioning over said graphic element utilizing said predetermined alternative selection technique;

program product means for invoking said customization routine in response to said selection of said graphic element utilizing said predetermined alternative selection technique, wherein said first graphical appearance of said graphic element may be customized;

program product means for creating a second graphical appearance of said graphic element utilizing said customization routine; and program product means for displaying said graphic element having said second graphical appearance.

24. The program product of claim 23, wherein said program product means for designating a predetermined alternative selection technique, further comprises program product means for designating a particular combination of keystrokes.

25. The program product of claim 24 wherein said program product means for designating a predetermined alternative selection technique, further comprises program product means for designating a particular combination of keystrokes and an input derived from a pointing device.

26. The program product according to claim 25, further comprising:

program product means for displaying said graphic element having said first graphical appearance, said first graphical appearance including a first name for said graphic element; and program product means for creating a second graphical appearance including a second name for said graphic element.

27. The program product according to claim 25, further comprising:

program product means for displaying said graphic element having said first graphical appearance, said first graphical appearance including a first icon associated with said graphic element; and program product means for creating a second graphical appearance including a second icon associated with said graphic element.

28. The program product according to claim 25, further comprising:

program product means for displaying said graphic element having said first graphical appearance, said first graphical appearance including a first location within a menu wherein said graphic element is displayed; and program product means for creating a second graphical appearance, said second graphical appearance including a second location within said menu wherein said graphic element is displayed.

29. The program product according to claim 25, further comprising:

program product means for displaying said graphic element having said first graphical appearance, said first graphical appearance including a first bitmap associated with said graphic element; and program product means for creating a second graphical appearance, said second graphical appearance including a second bitmap associated with said graphic element.

30. The program product according to claim 25, further comprising:

program product means for displaying said graphic element having said first graphical appearance, said first graphical appearance including said graphic element being visible; and program product means for creating a second graphical appearance, said second graphical appearance including said graphic element being invisible.

31. The program product according to claim 25, further comprising:

program product means for displaying said graphic element having said first graphical appearance, said first graphical appearance including said graphic element being invisible; and program product means for creating a second graphical appearance, said second graphical appearance including said graphic element being visible.

32. The program product according to claim 25, wherein said program product means for designating a particular combination of keystrokes and an input derived from a pointing device further comprises program product means for designating a depression of an ALT key in combination with an input selection made utilizing a mouse button.

33. The program product according to claim 25, wherein said program product means for designating a particular combination of keystrokes and an input derived from a pointing device further comprises program product means for designating a depression of a CTRL key in combination with an input selection made utilizing a mouse button.

34. A program product residing in a memory of a data-processing system for customizing graphic elements displayed within a graphic interface of said data-processing system, said program product comprising:

display means for displaying within said graphic interface a graphic element, wherein a selection of said graphic element triggers a standard course of action associated with said particular graphic element;

positioning means for positioning a cursor over said graphic element;

designating means for designating a predetermined alternative selection technique that allows a user to define an alternative course of action which may be associated with said particular graphic element over which said cursor is positioned in place of said standard course of action;

defining means for defining said alternative course of action to invoke a customization routine, in response to initiating said predetermined alternative selection technique;

associating means for associating said alternative course of action with said graphic element over which said cursor is positioned such that a subsequent selection of said graphic element over which said cursor is positioned triggers said alternative course of action;

initiation means for subsequently initiating said alternative course of action in response to said selection of said graphic element;

signal bearing media bearing said display means, said designating means, said defining means, said associating means, and said initiation means.

35. The program product of claim 34 wherein said display means for displaying within said graphic interface a graphic element, wherein a selection of said graphic element triggers a standard course of action associated with said particular graphic element, further comprises:

display means for displaying within said graphic interface, a graphic element that includes a menu having a plurality of menu items, such that a selection of a particular menu item triggers a standard course of action associated with said particular menu item.

* * * * *